United States Patent [19]

Itoku et al.

[11] Patent Number: 4,807,117
[45] Date of Patent: Feb. 21, 1989

[54] INTERRUPTION CONTROL APPARATUS

[75] Inventors: Osamu Itoku; Yukio Maehashi; Yukihiro Nishiguchi, all of Tokyo, Japan

[73] Assignee: NEC Corporation, Tokyo, Japan

[21] Appl. No.: 632,190

[22] Filed: Jul. 19, 1984

[30] Foreign Application Priority Data

Jul. 19, 1983 [JP] Japan .................. 58-131417
Feb. 21, 1984 [JP] Japan .................. 59-30662
Feb. 21, 1984 [JP] Japan .................. 59-30663

[51] Int. Cl.⁴ ............................................ G06F 13/00
[52] U.S. Cl. .................................................. 364/200
[58] Field of Search .................. 364/200 MS, 900 MS

[56] References Cited

U.S. PATENT DOCUMENTS

| | | | |
|---|---|---|---|
| 3,643,229 | 2/1972 | Stuebe et al. | 364/200 |
| 3,905,025 | 9/1975 | Davis et al. | 364/200 |
| 3,909,790 | 9/1975 | Shapiro et al. | 364/200 |
| 3,949,371 | 4/1976 | Pederzini | 364/200 |
| 4,047,158 | 9/1977 | Jennings | 364/900 |
| 4,090,238 | 5/1978 | Russo | 364/200 |
| 4,100,601 | 7/1978 | Kaufman et al. | 364/200 |
| 4,106,091 | 8/1978 | Hepworth et al. | 364/200 |
| 4,159,518 | 6/1979 | Draper et al. | 364/200 |
| 4,334,288 | 6/1982 | Booher | 364/900 |
| 4,473,880 | 9/1984 | Budde et al. | 364/200 |
| 4,482,949 | 11/1984 | Cates | 364/200 |
| 4,499,538 | 2/1985 | Finger et al. | 364/200 |
| 4,511,959 | 4/1985 | Nicolas | 364/200 |
| 4,541,043 | 9/1985 | Ballegeer et al. | 364/200 |
| 4,621,342 | 11/1986 | Capizzi et al. | 364/900 |

Primary Examiner—Gary V. Harkcom
Assistant Examiner—Christopher H. Lynt
Attorney, Agent, or Firm—Sughrue, Mion, Zinn, Macpeak & Seas

[57] ABSTRACT

An interruption control apparatus includes registers storing priority data and a circuit producing scanning data in a priority order. The priority data is compared with the scanning data by a scanning operation. If the priority data is equal to the scanning data, a coincidence signal is generated. An interruption request signal from an interruption source is transferred to an interruption processing unit only when the coincidence signal is being generated. Thus, a priority control for a plurality of interruption requests can be performed by using a simple hardware circuit without complex software processing.

5 Claims, 12 Drawing Sheets

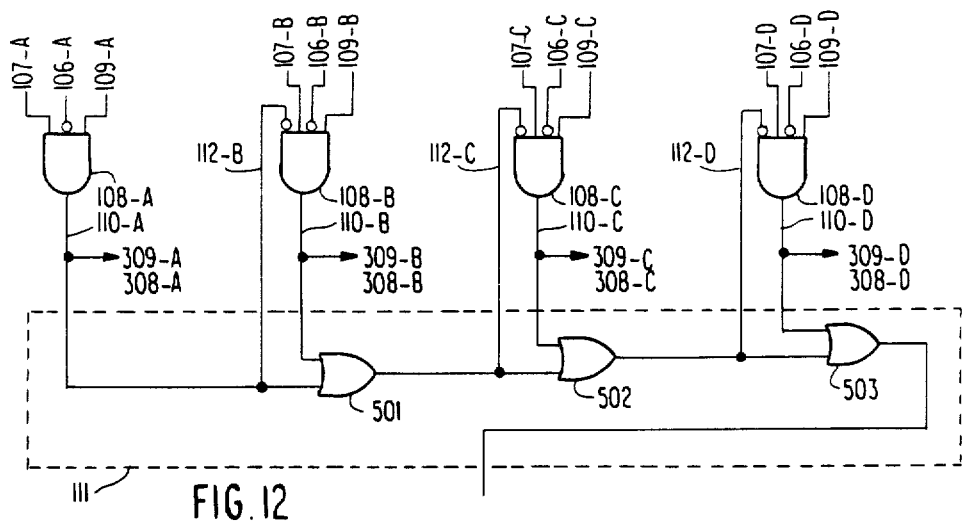
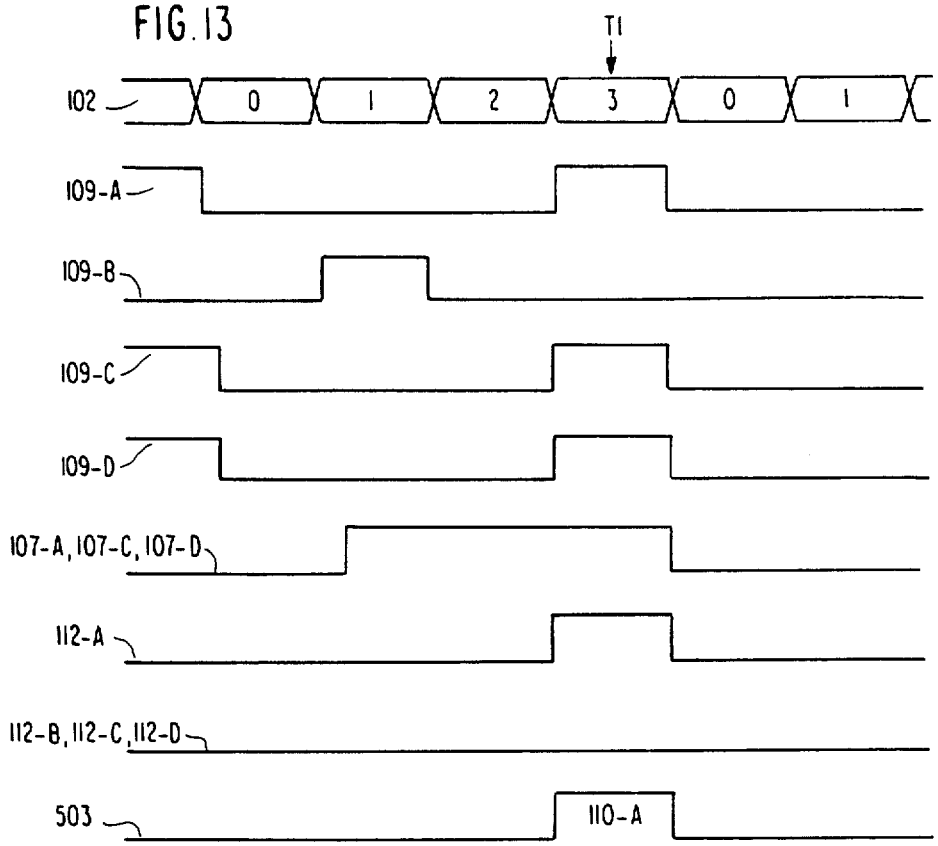

INTERRUPTION CONTROL APPARATUS

BACKGROUND OF THE INVENTION

1. Field of the Invention

The present invention relates generally to a data processing apparatus, and more particularly to a method and an apparatus for controlling a plurality of interruption processings in a data processing system.

2. Description of the Prior Art

An interruption control functions to temporarily stop the program processing which is being row executed by a central processing unit (which will be called the "CPU"), when the CPU must execute an urgent processing, and to cause the CPU to preferentially execute the urgent processing. In general, a plurality of interruption sources are employed in a data processing system, and through an interrupt request each source requests urgent processings by the CPU at an arbitrary timing. In a microcomputer, these interruption sources are divided into two kinds, external sources and internal sources.

The external sources are provided outside of the microcomputer chip and involve a source for making a microcomputer recognize that an external device coupled to the microcomputer chip has come into a special state, a source for indicating a processing request from an external peripheral unit to the microcomputer, and so on. On the other hand, the internal sources are provided in the microcomputer chip and involve a source for indicating a processing request from an internal peripheral unit, such as a timer or an interface unit, and so on.

When the microcomputer is coupled to a variety of interruption sources, plural sources may simultaneously request interruptions, or another interruption may be generated during a processing initiated by a previous interruption (a multiple interruption mode). For example, the interruption request from an internal timer and the interruption request from a data transfer unit may simultaneously occur, or the external interruption request may occur during the internal interruption processing. In these cases, the interruption which is to be preferentially processed must be determined quickly.

For example, in the case where an internal timer interruption request and an external interruption request simultaneously occur, and the internal interruption request signals that an external unit must be controlled on a real time basis over a designated time interval by a microcomputer generated control signal, the internal timer interruption has priority. On the other hand, when external data is to be inputted into the microcomputer at high speed by use of the external interruption, the processing of the external peripheral unit is delayed unless the external interruption has priority.

Since the priority order for interruptions in data processing systems is subject to change, the interruption control apparatus used in a data processing system must be capable of changing the priority order for interruptions. If an interruption having a higher priority occurs during the period when one interruption is being processed, the interruption control apparatus must direct execution of the interruption processing program of the higher priority.

Moreover, it is also desired to provide an interruption control by which a plurality of interruptions with the same priority level can be processed.

In the prior art, an interruption control apparatus having the aforementioned control functions needs a very complex hardware mechanism or needs many steps of software processing. The complex hardware mechanism is very expensive, and has limited system application because the priority is fixed by the hardware design. The software processing also has its limitations for a long period of time is required for interruption control using software processing.

SUMMARY OF THE INVENTION

An object of the present invention is to provide an interruption control apparatus in which the priority order of a plurality of interruptions can be easily changed by use of a simple hardware circuit.

Another object of the present invention is to provide an interruption control apparatus which can easily control a multi-interruption mode and can search an interruption request having a higher priority level than that of the interruption which is being processed.

Still another object of the present invention is to provide an interruption control apparatus in which a plurality of interruptions with the same priority level can be handled.

Still another object of the present invention is to provide an interruption control apparatus which can control a plurality of interruption sources having the same priority order.

Still another object of the present invention is to provide an interruption control apparatus in which a single predetermined interruption is selected in a simple manner when a plurality of interruptions are simultaneously requested.

Still another object of the present invention is to provide a novel method for controlling interruptions by which a smooth priority detection can be performed with a simple hardware circuit and without a complex software processing.

An interruption control apparatus according to the present invention comprises a plurality of storing means for storing respective priority data, a means for producing a plurality of scanning data representing priority order, a plurality of comparing means coupled to the storing means for receiving the scanning data and comparing the received scanning data with the priority data stored in the storing means coupled thereto, to generate a coincidence signal when the compared data are coincident, a plurality of receiving means for receiving respective interruption request signals from respective interruption sources, a plurality of transferring means coupled respectively to the comparing means and the receiving means for transferring the interruption request signal in response to the coincidence signal, a means coupled to the producing means and the plurality of transferring means for inhibiting production of scanning data representing a lower priority order than that of the scanning data when the coincidence signal is generated, and an interruption processing unit coupled to the transferring means and receiving the transferred interruption request signal.

In the operation according to the present invention, the priority data is first stored in the storing means. This storing operation may be performed by a central processing unit, a key input, or the like. Therefore, the storing means is a programmable After the storing operation, the scanning data produced by the producing means (for example, a counter means, a memory means for sequentially outputting a plurality of scanning data preset therein, or the like) is transferred to the comparing means. The comparing means generates the coincidence signal when the priority data in the storing means is equal to the scanning data, whereby an interruption request signal from an interruption source is sent to the processing unit in response to the coincidence signal. Of course, the coincidence signal is not generated when the priority data is not equal to the scanning data, and therefore, the interruption request signal is not sent to the processing unit, even if the interruption source requests the interruption processing. The transferring means transfers the interruption request signal to the interruption processing unit, whereupon the interruption processing unit performs the processing according to the request signal. At this time, the inhibiting means inhibits production of the scanning data representing a lower priority order than that of the scanning data when the coincidence signal is generated. As the result, the interruption processing unit can perform a processing in a multi-interruption mode, and particularly can receive an urgent interruption when the processing according to the interruption which has been previously requested is being performed. Further, with the use of a scanning operation the aforementioned interruption control can be extremely simple.

Furthermore, the interruption control apparatus of the present invention can be applied to a data processing system in which a plurality of interruption sources have the same priority order. In this case, it should be noted that a select means for selecting only one interruption request among the plural interruption requests from the sources having the same priority order is put before the transferring means. The selected interruption is identified by a coincidence signal. Thus, a plurality of interruptions can be controlled by a small number of hardware circuits.

Moreover, in the case where a priority setting circuit is added to the interruption control apparatus according to the present invention, a specific control can be performed. The priority setting circuit comprises a gate circuit by which only a predetermined interruption request signal is selected and the remaining reguest signals are inhibited. This gate circuit is provided between the transferring means and the interruption processing unit. Thus, when a plurality of interruption request signals are simultaneously transferred from the transferring means, only one request signal is selected and transferred to the processing unit without any software processings.

According to the present invention, a novel method suitable for an interruption control comprises the following steps:

the step of programmably storing priority data in registers;

the step of producing scanning data in accordance with a priority order;

the step of comparing the priority data with the scanning data;

the step of generating a coincidence signal when the priority data is equal to the scanning data;

the step of transferring an interruption request signal from an interruption source to an interruption processing unit in response to the coincidence signal; and the step of changing the scanning data in range from between the highest priority order to the lowest priority order, to the range between the highest priority order to a higher priority order than that of the interruption request signal transferred to the interruption processing unit or to the range between the highest priority order to the same priority order as that of the interruption request signal transferred to the interruption processing unit.

DETAILED DESCRIPTION OF THE EMBODIMENTS

Figure 1:
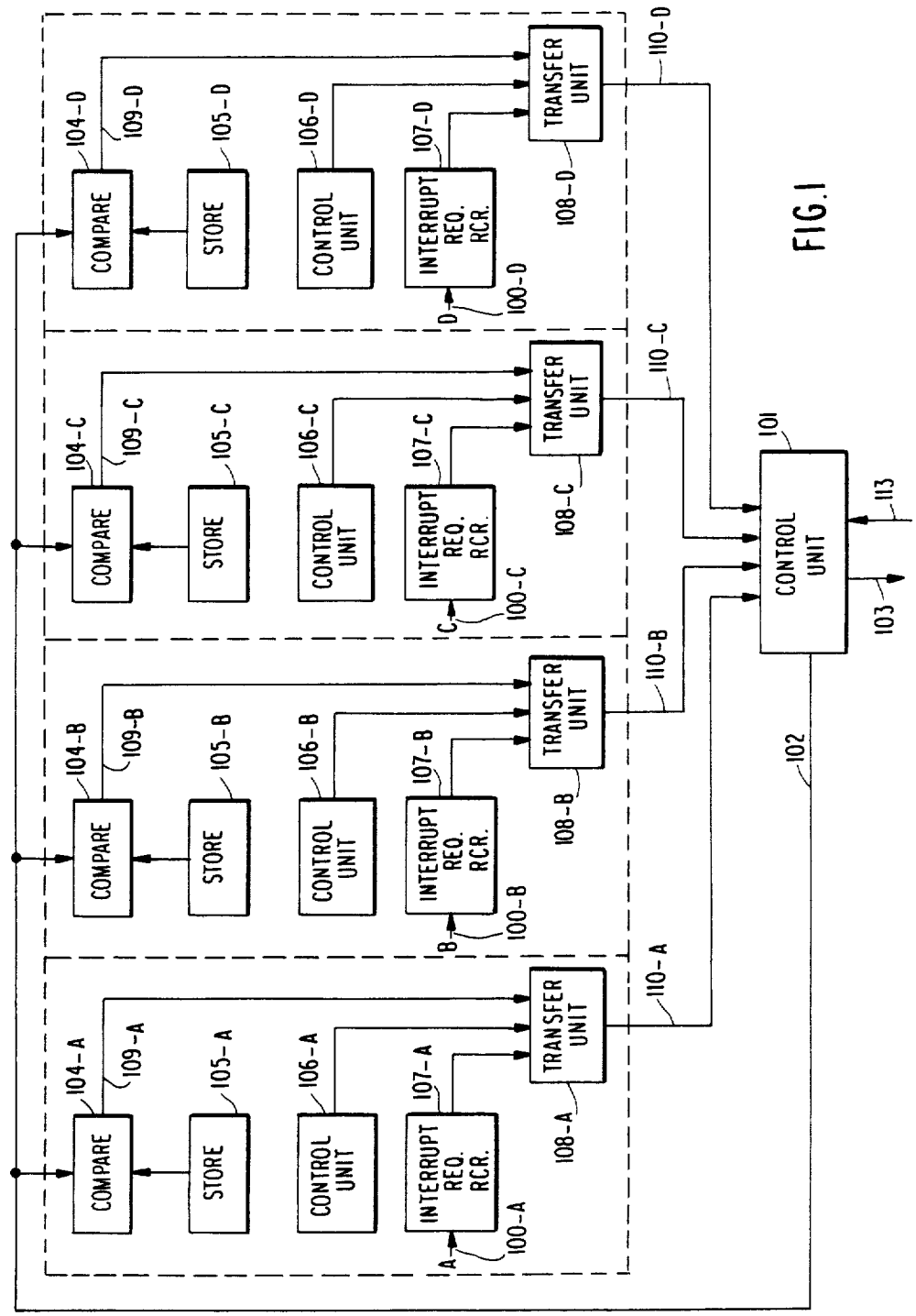
FIG. 1 is a block diagram showing an interruption control apparatus of one embodiment of the present invention.
Figure 5:
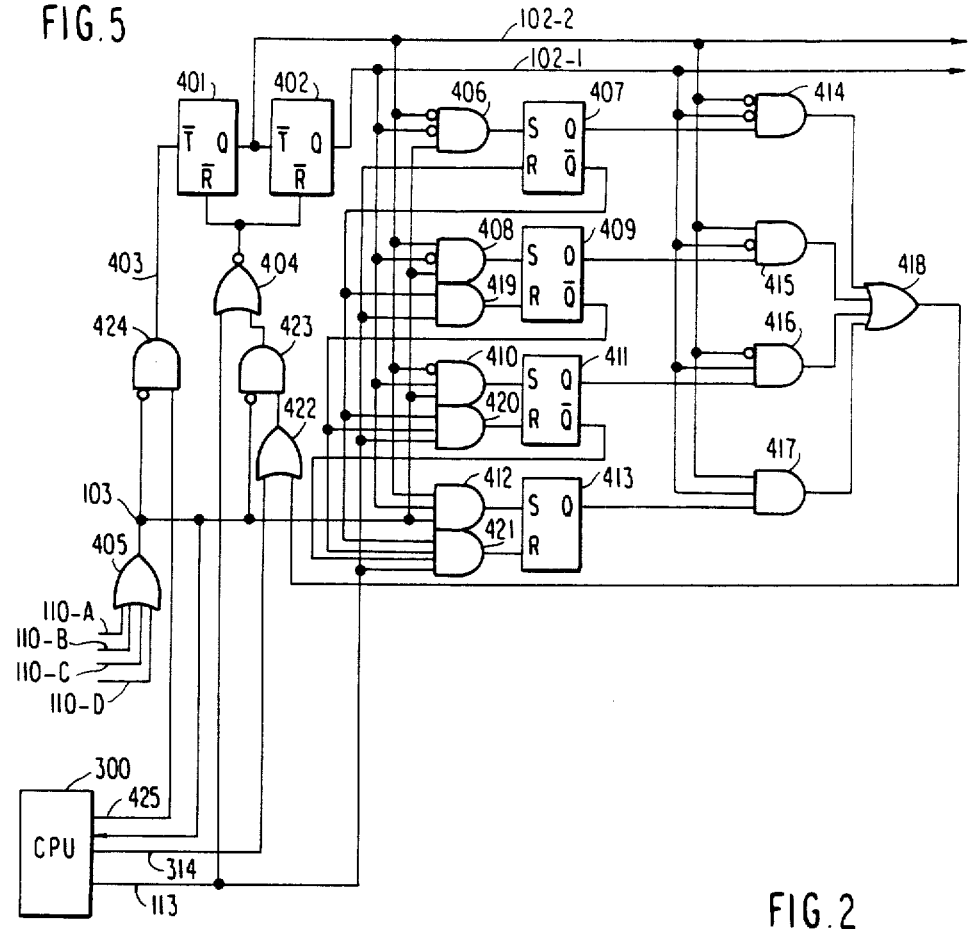
Figure 3:
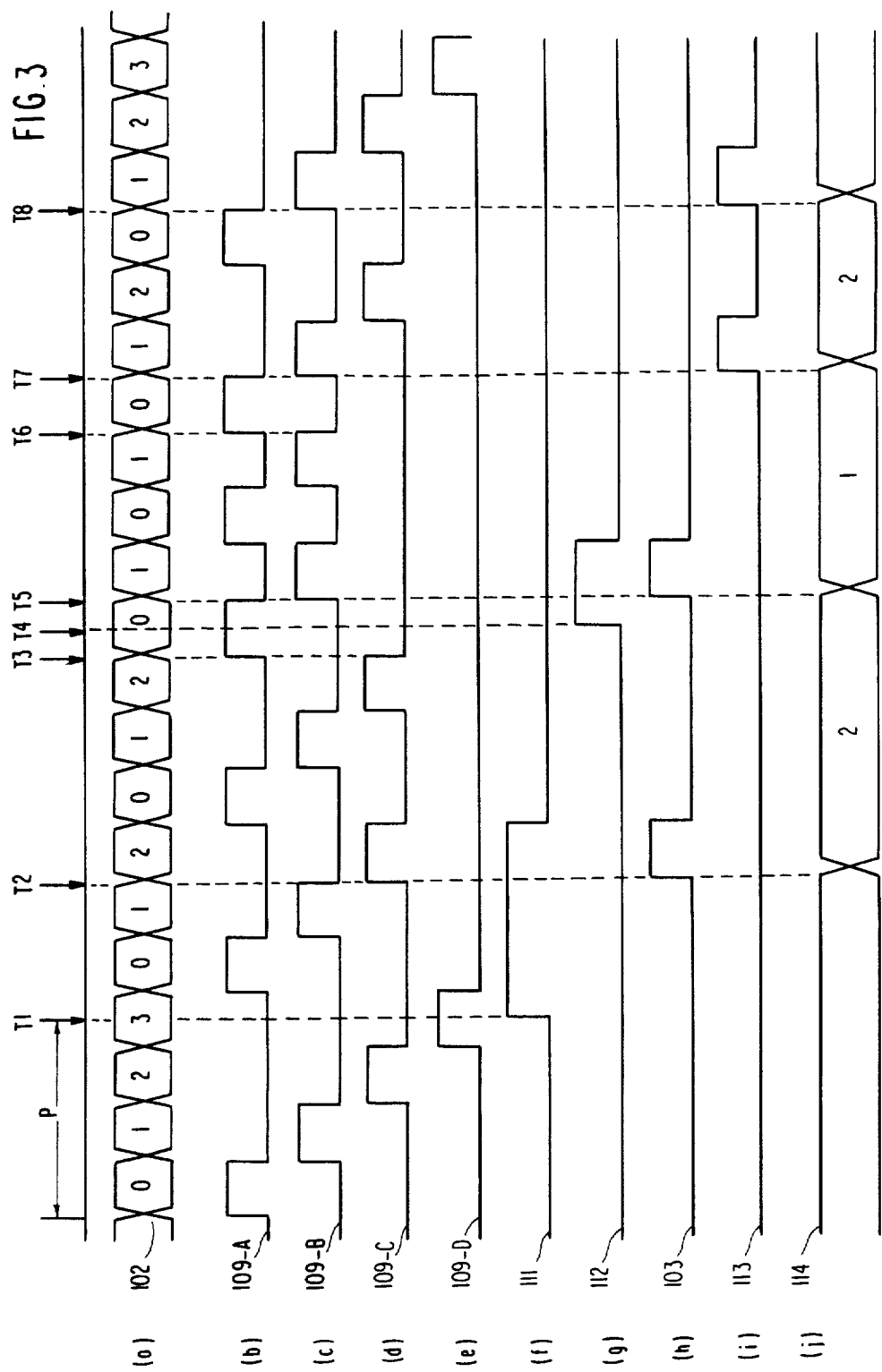
Figure 4:
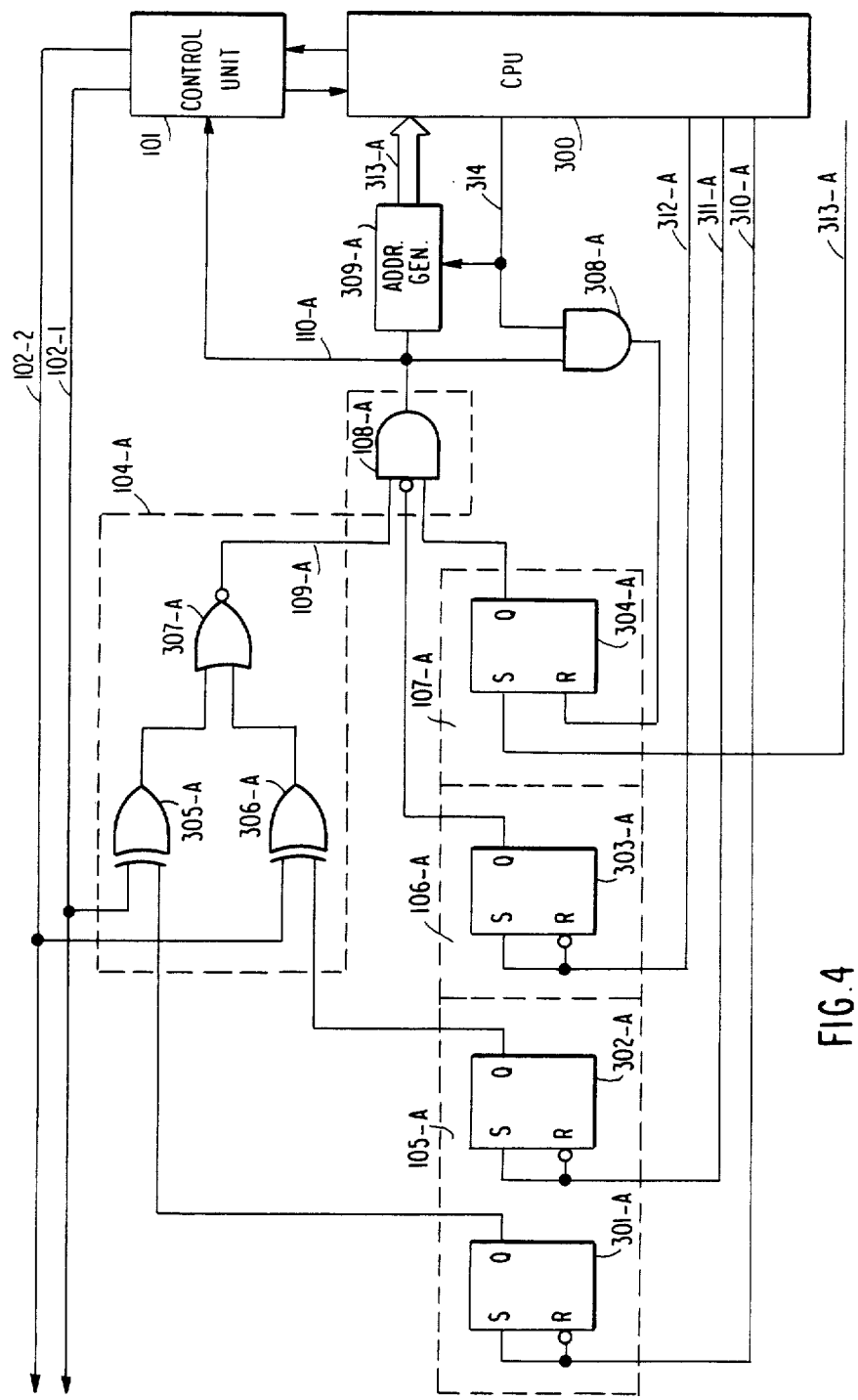
Figure 6:
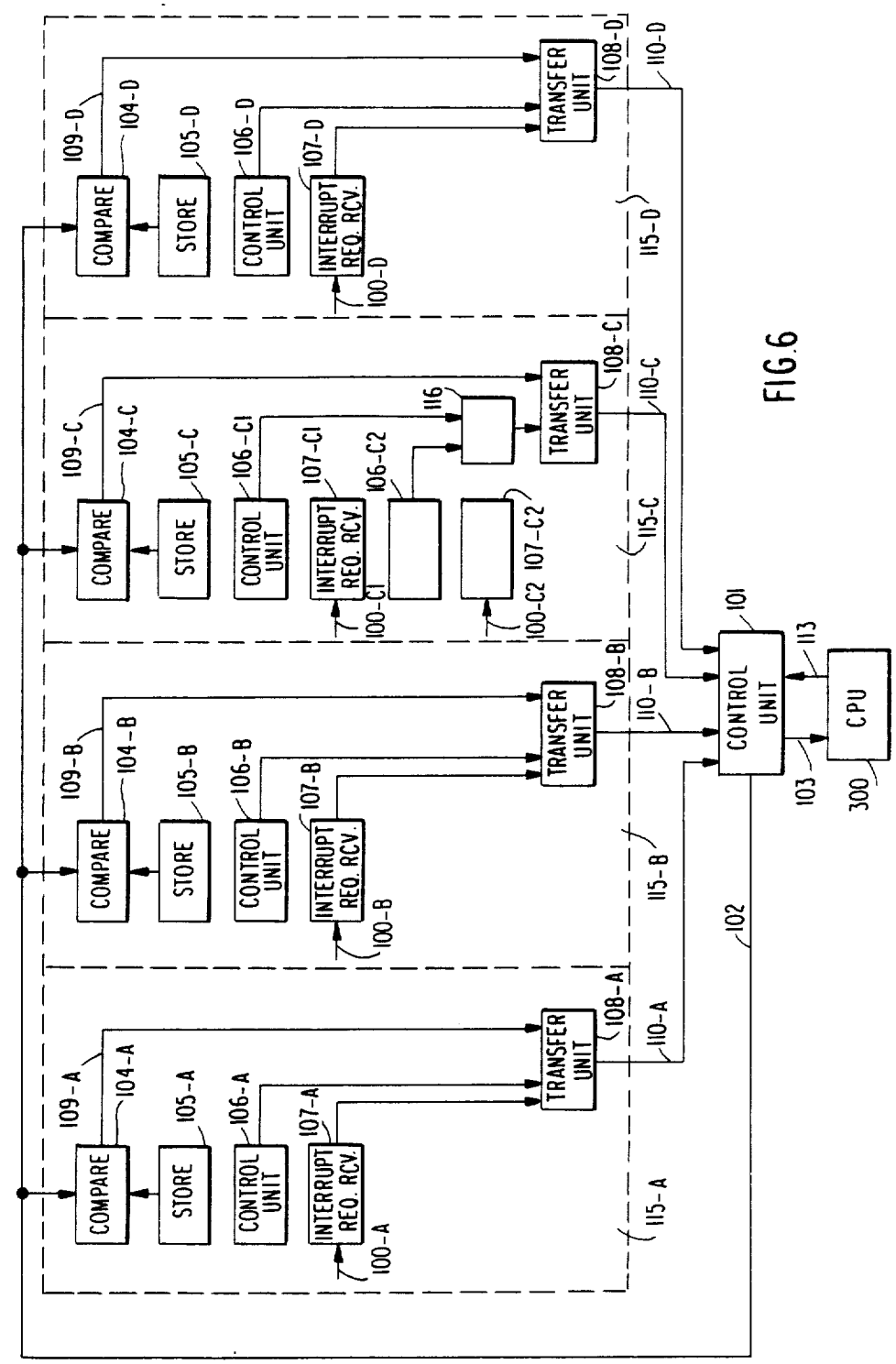
Figure 7A:
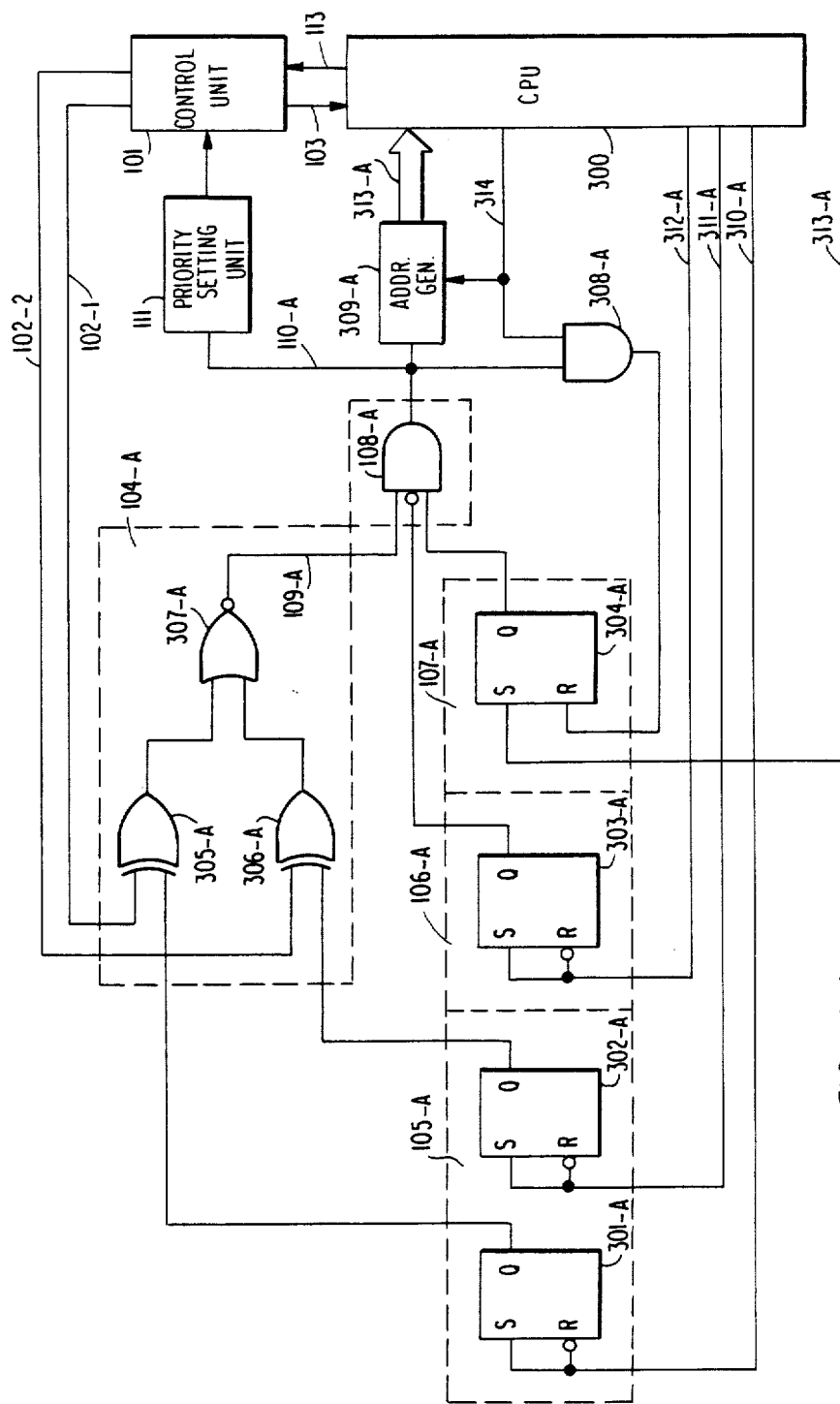
Figure 7B:
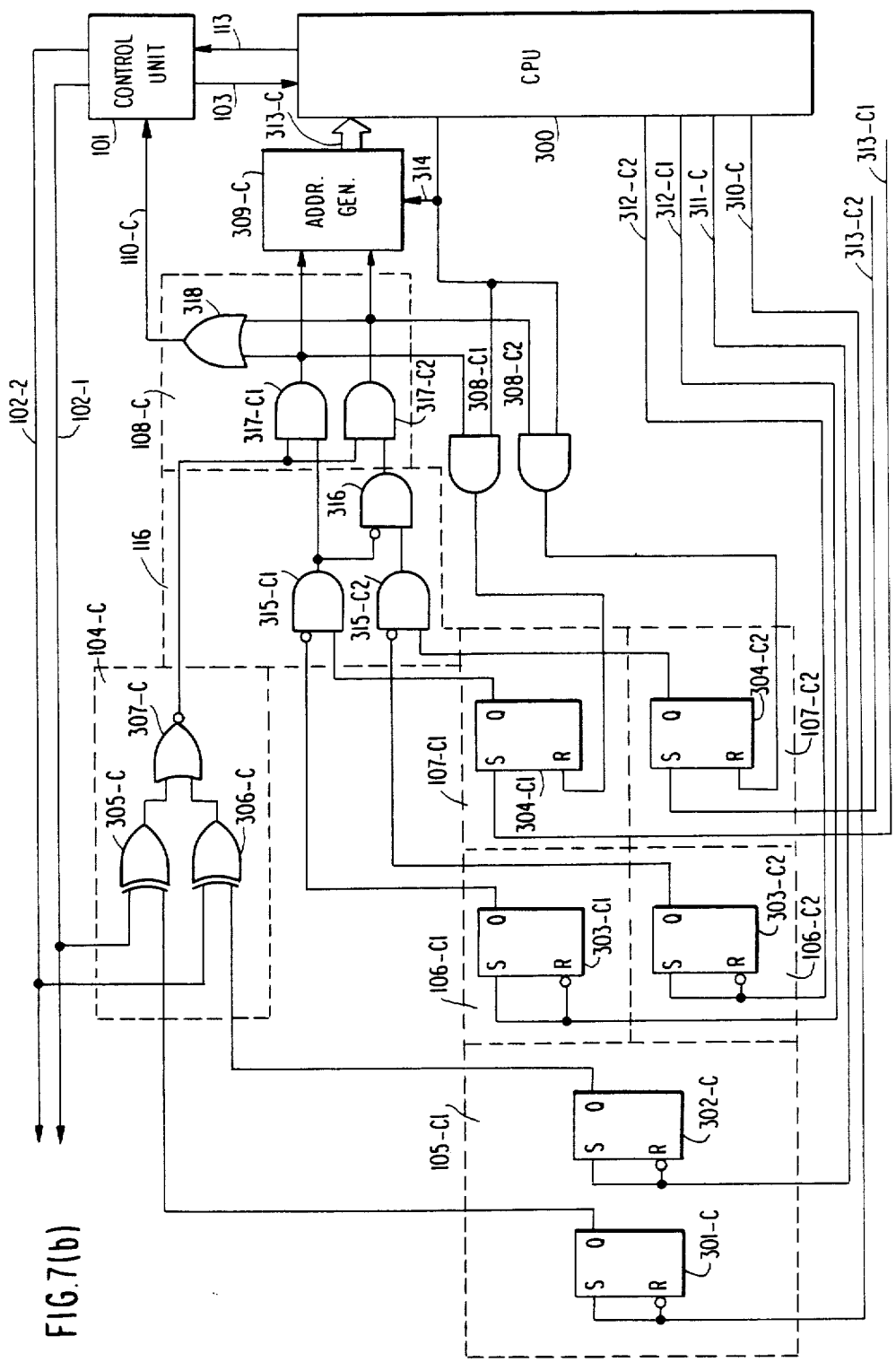
Figure 8:
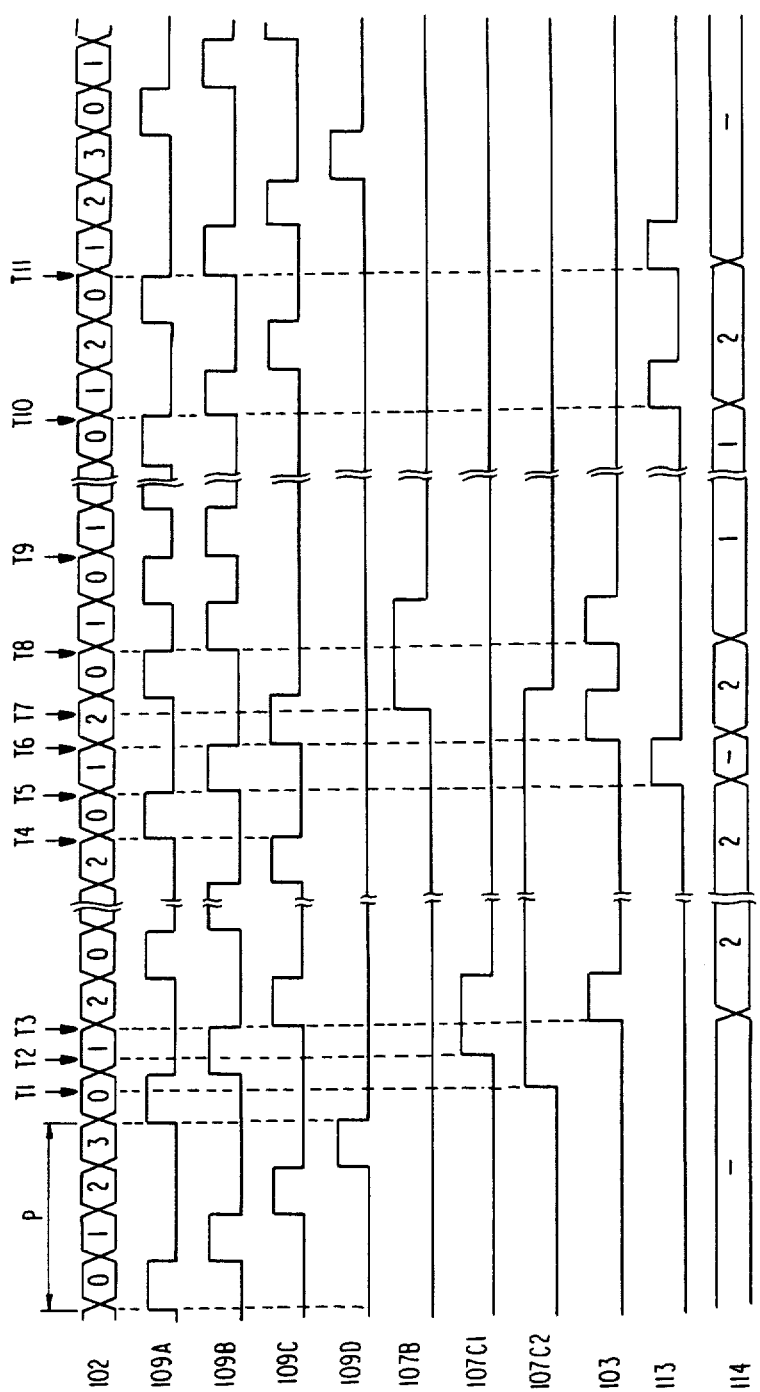
Figure 9:
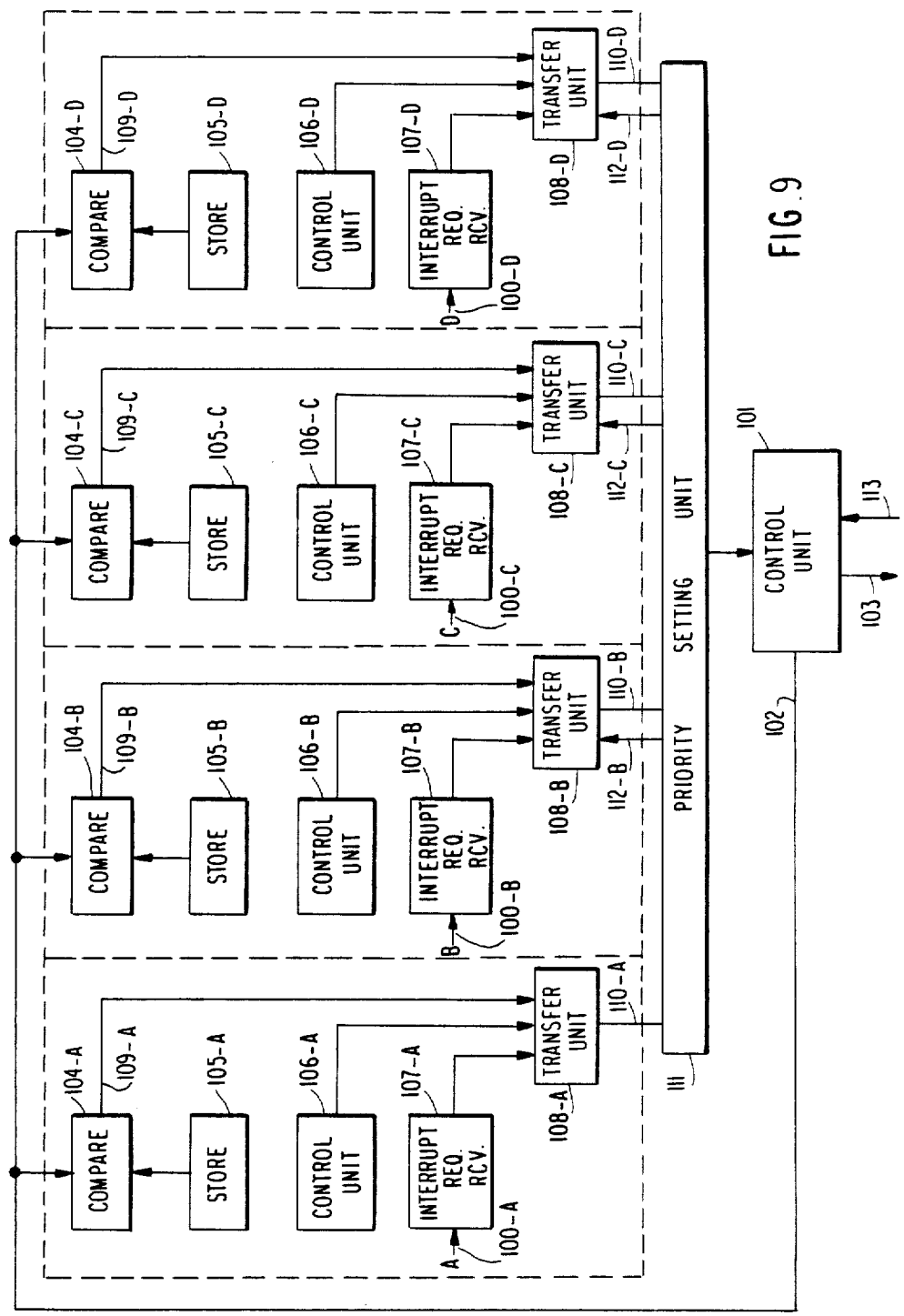
Figure 10:
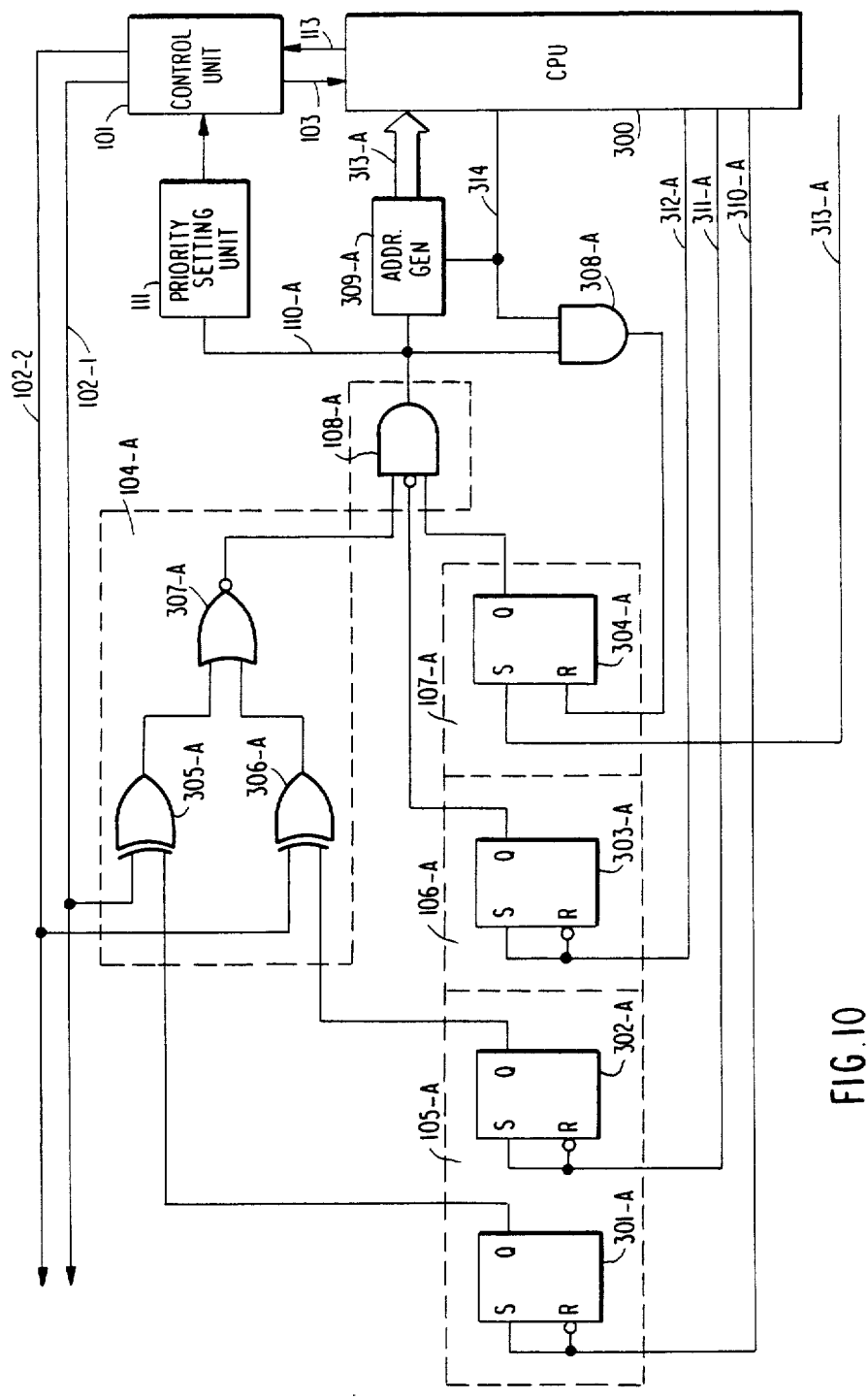
Figure 11:
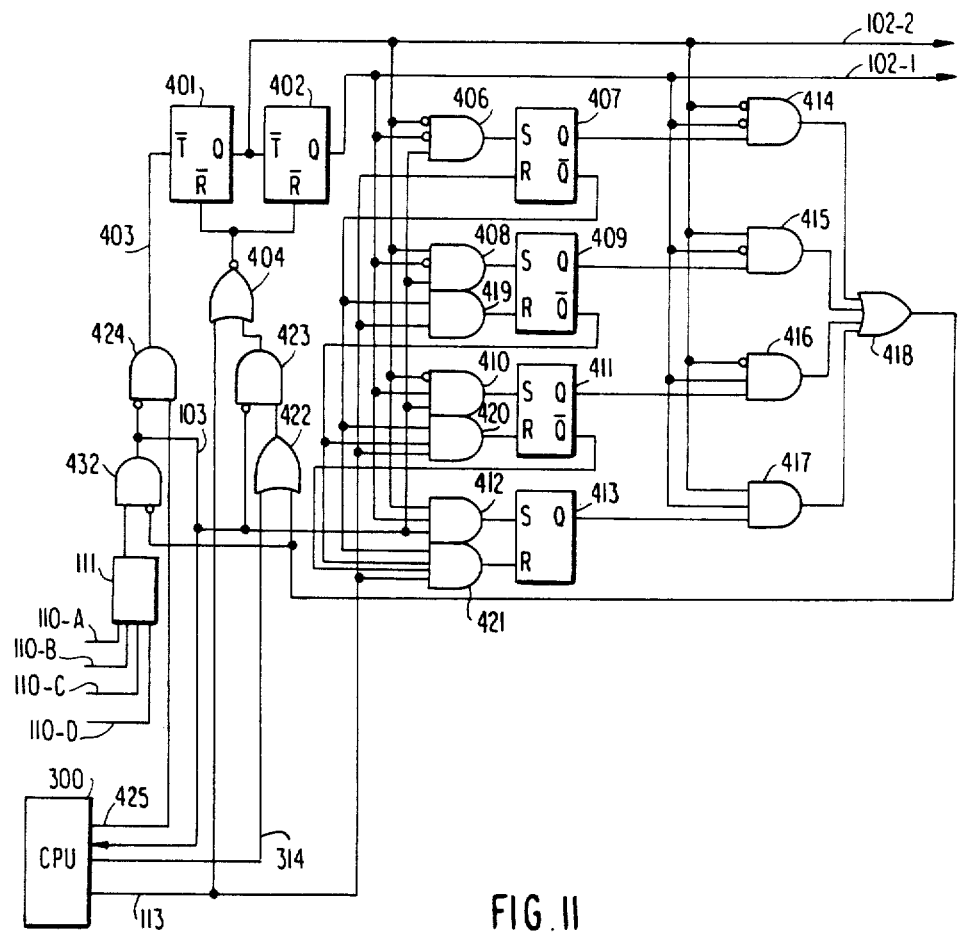

FIG. 3, (a) to (j) is a timing chart showing the operations of the apparatus in FIG. 1;

FIG. 4 is a circuit diagram showing one example of the priority assigning unit, the interrupt receiving control unit, the interrupt request memory unit, the detecting unit and the interrupt receiving unit of the embodiment of FIG. 1;

FIG. 5 is a circuit diagram showing one example showing the control unit in the embodiment of FIG. 1;

FIG. 6 is a block diagram showing another embodiment of the present invention;

FIGS. 7 (a) and (b) are block diagrams of the internal circuits of the blocks A and C of FIG. 6, respectively;

FIG. 8 is a timing chart showing the operation of the embodiment of FIGS. 6, 7 (a) and 7 (b);

FIG. 9 is a block diagram showing the construction of the other embodiment of the present invention;

FIG. 10 is a specific circuit diagram showing the priority assigning unit, the interruption receiving control unit, the interrupt request memory unit, the detecting unit and the interruption receiving unit of FIG. 9;

FIG. 11 is a circuit diagram showing the control unit of FIG. 9;

FIG. 12 is a circuit diagram showing the priority setting unit of FIG. 9: and

FIG. 13 is a timing chart showing the operations of FIG. 9.

DESCRIPTION OF THE EMBODIMENTS

The preferred embodiment of the present invention will be described with reference to the accompanying drawings. FIG. 1 is a block diagram of an interruption control apparatus showing one embodiment of the present invention, in which there are four interrupt sources A, B, C and D. The reference numbers appearing in the drawings with suffixes A, B, C and D indicate circuits which process interrupt requests from the interrupt sources A, B, C and D, respectively. The respective circuit sections within the broken line blocks of FIG. 1 which process the interrupt requests from the respective interrupt sources, have substantially the same hardware circuit. The following description is directed to the circuitry assigned to process the interruption request 100-A from the interrupt source A.

A unit 105-A is provided with a register in which data for designating a priority level of the interruption source A is preliminarily stored by means of a central processing unit (CPU) according to a program. A control unit 101 generates scanning data 102 for scanning a priority level from a higher order to a lower order. A detecting unit 104-A compares the scanning data 102 with the data stored in a register of the unit 105-A, and outputs a coincidence signal 109-A when both data are the same. An interruption receiving unit 108-A outputs an interruption receiving signal 110-A when the coincidence signal 109-A has been outputted from the detecting unit 104-A, when an interrupt request control unit 106-A generates an interruption grant signal, and when act interrupt request unit 107-A generates a interruption request according to the request signal 100-A. The portions corresponding to the interruption sources B, C and D perform substantially the same operations.

Figure 2:
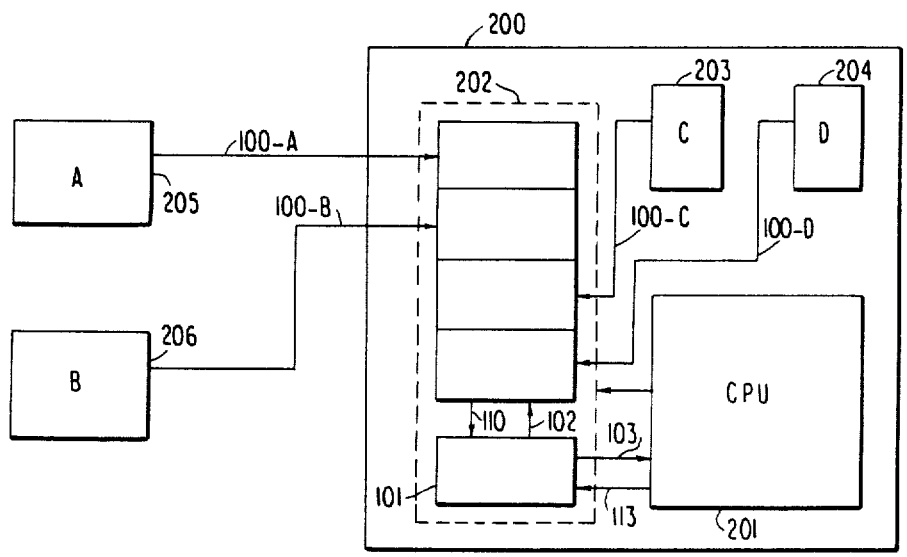
FIG. 2 is a block diagram of the data processing system in which the apparatus of FIG. 1 is employed.

Now, it is assumed that the interruption sources A and B are external interruption sources, while that the interruption sources C and D are internal interruption sources, as shown in FIG. 2. In FIG. 2, a microcomputer 200 includes a central processing unit (CPU) 201, the internal interruption sources 203 and 204 and the interruption control section 202 of FIG. 1. The external interruption sources 205 and 206 are provided outside of the microcomputer 200 and transfers the interruption request signals 100-A and 100-B to the microcomputer 200. The microcomputer 200 may be constructed on a single semiconductor chip. Further, the interruption control section 202 may be separated from the microcomputer chip in which the CPU 201 and the internal interruption sources 203 and 204 are integrated. In this embodiment, the interruption control section 202 is integrated in the microcomputer chip as shown in FIG. 2.

Next, the operations of the control unit 101 will be described. The control unit 101 sequentially changes the scanning data 102 from the highest priority order to the lowest priority order and continues cyclic scanning operations when none of interruption receiving signals 110-A, B, C and D is received. If any of the interruption receiving signals 110-A, B, C and D is received, the control unit 101 stores the received signal and inhibits production of the scanning data corresponding to a lower order than that of the received signal. That is, the control unit 101 changes the scanning data 102 to limit its range to the interval which includes the highest priority level to the level of the interruption being processed in the CPU. Thereafter, when an interruption processing terminating signal 113 is sent from the CPU, the control unit 101 starts production of all scanning data in the aforementioned manner, if no multi-interruption mode is executed. However, in the multi-interruption mode, the control unit 101 performs a control for the interruption which has been stored in the control unit 101 as described hereinafter.

FIG. 3 (a to j) is a timing chart showing the operations of the embodiment of FIG. 1. The signals 102, 109-A, B, C and D and 103 correspond to the same signals of FIG. 1, respectively. A signal 111 is an interruption request signal from the interruption source C, and a signal 112 is an interruption request signal from the interruption source B. Data 114 is stored in the control unit 101 according to the interruption receiving signals 110-A to 110-D and indicates the priority of the interruption receiving signals. Incidentally, the priority is assumed to be in the order "0", "1", "2" and "3" with "0" designating the highest priority.

The operations will be described with reference to FIGS. 1, 2 and 3. First of all, the priority data are written in the individual units 105-A to D by the use of signals produced by the CPU 201 according to a program. Now, it is assumed that the priority data "0" is written in the unit 105-A, that the priority data "1" is in the unit 105-B, that the priority data "2" is in the unit 105-C, and that the priority data "3" in the unit 105-D. The control unit 101 sequentially produces the priority data "0" to "3" and transfers them to the detecting units 104-A to 104-D as shown in FIG. 3 (a). The detecting unit 104-A generates the coincidence signal 109-A when the priority data "0" is transferred from the control unit 101 as shown in FIG. 3 (b). The other detecting units 104-B to 104-D generate the coincidence signals 109-B to 109-D, respectively, in response to the corresponding priority data "1" to "3" as shown in FIG. 3 (c) to (e). When no interruption receiving signals 110-A to 110-D are received at the control unit 101 in the period from a generation of the priority data "0" till a generation of the priority data "3", the control unit 101 reproduces priority data "0" to "3", sequentially, and transfers them one by one to the detecting units.

Here, it is assumed that an interruption is requested at a timing T1 from the internal interruption source C and that the interruption is to be granted. When the scanning data 102 becomes the priority data "2" at the timing T2, the coincidence signal 109-C is generated, and therefore, the interruption receiving unit 108-C generates an interruption receiving signal 110-C. As the result, the control unit 101 transfers the interruption signal 103 to the CPU, and stores the priority data "2" as shown in FIG. 3 (f) (h) and (j).

The control unit 101 produces the priority data "0" to "2" while the CPU executes the interruption processing according to the internal interruption source C, in order to accept a higher priority interruption after the timing T2. In this period, if no interruptions are requested to the control unit 101, the control unit 101 reproduces the priority data "0" at a timing T3.

Next, it is assumed that at a timing T4 an interruption of a higher priority is requested from the interruption source B. When the interruption from the source B is to be granted, and when the scanning data 102 becomes the priority data "1" at a timing T5, the coincidence signal 109-B is generated. As the result, this higher priority interruption is received, and the control unit 101 sends the interrupt signal 103 to the CPU. At this time, the control unit 101 stores the priority data "1" besides the priority data "2". In this condition, the control unit 101 is in a multi-interruption mode and indicates the request of the higher priority interruption to the CPU by means of the signal 103 of FIG. 3. The CPU temporarily stops the processing of the interruption request from the interruption source C, and starts the processing of the interruption request from the interruption source B. The control unit 101 now produces the scanning data 102 designating only the priority data "0" and "1". The scanning data returns to "0" at a timing T6 when no interruption is requested from the interruption sources A and B. Thereafter, when the CPU terminates the processing according to the interruption request B, a terminating signal 113 is applied to the control unit 101 as shown in FIG. 3 (i). In response to this terminating signal 113, the control unit 101 resets the priority data "1". Therefore, only the priority data "2" is stored in the control unit 101 at this time. The CPU reexecutes the processing according to the interruption request C which has been temporarily stopped. The control unit 101 sequentially produces the priority data "0", "1" and "2" in this order and serially sending them to the detecting units. When the processing of the interruption request C is terminated, the control unit 101 resets the priority data "2" in response to the terminating signal 113 of FIG. 3 (i). Thus, not only a single-interruption mode but also a multi-interruption mode can be easily performed by means of a simple hardware circuit.

Next, an example of a specific circuit implementing the embodiment of the present invention shown in FIG. 1 is shown in FIG. 4. FIG. 4 is a circuit diagram showing one example of the units 104-A, 105-A, 106-A, 107-A and 108-A of FIG. 1. Reset-set-flip-flops 301-A and 302-A are provided as the unit 105-A and are operative to store the priority data consisting of higher and lower bits. The priority data can be programmably written from a CPU 300 by the use of signals 310-A and 311-A. Signals 102-1 and 102-2 are higher and lower bits when the scanning data 102 consists of two bits. Exclusive OR gates 305-A and 306-A compare the higher bit 102-1 and the lower bit 102-2 of the scanning data with the priority data set in the R.S flip-flops 301-A and 302-A, respectively. An NOR gate 307-A produces a coincidence signal when the scanning data is equal to the priority data. That is, when the priority data and the scanning data 102 are equal, the NOR gate 307-A outputs the logical value "1" as the coincidence signal 109-A. These two exclusive OR gates and the one NOR gate together form the detecting unit 104-A. An R·S-flip-flop 303-A is a mask register which corresponds to the unit 106-A so that it is set by the use of a signal 312-A when the interruption is masked (inhibited) and is reset when the interruption is not masked (granted). A flip-flop 304-A is an interrupt request flag which is set when an interrupt request signal 313-A is sent from the interrupt source A, and is reset either when the interrupt request is not generated or when the output of an AND gate 308-A is at "1". This interrupt request flag 304-A corresponds to the interrupt request unit 107-A. Numeral 108-A indicates an AND gate operative to output the interruption receiving signal 110-A when the coincidence signal 109-A is the logical value "1", when the flip-flop 303-A as the mask register is reset, and when the interrupt request flag is set. This AND gate forms the interruption receiving unit 108-A. A vector generation unit 309-A generates a vector address for designating an interruption program according to the interruption source A to the CPU 300 when an acknowledgement signal 314 is sent from the CPU 300. The acknowledgement signal 314 is generated when the CPU 300 receives the interruption signal 103 from the control unit 101. The interruption request flag 304-A is reset by the output of the AND gate 308-A when the interruption receiving signal 110-A is at "1" and when the acknowledgement signal 314 is at "1".

FIG. 5 is a circuit diagram showing one example of the control unit 101 in the embodiment of FIG. 1. The signals 102-1 and 102-2 are the outputs of trigger type flip-flops 401 and 402, respectively. The signal 102-2 is inverted at the trailing edge of a clock signal 403, and the signal 102-1 is inverted at the trailing edge of the signal 102-2. In other words, the T-flip-flops 401 and 402 form a quaternary counter for producing scanning data by counting the clock signal 403. The signals 102-1 and 102-2 represent the higher bit and lower bit of the scanning data 102, respectively. The quaternary counter constructed of the T-flip-flops 401 and 402 is reset when the output of a NOR gate 404 becomes the logical value "1".

When any of the interruption receiving signals 110-A, B, C and D is active, the interruption signal 103, i.e., the output of an OR gate 405, becomes the value "1". In this operation, it should be noted that when the interruption receiving signal 110-A is applied to the OR gate 405, the scanning data is the priority data "0", that is, both the signals 102-1 and 102-2 are at "0". Further, when the interruption signal 110-B is applied to the OR gate 405, the scanning data is "1", that is the signal 102-1 is "1" and the signal 102-2 is "0". While, when the signal 110-C is applied, the scanning data is "2". Furthermore, when the signal 110-D is active, the scanning data is "3", that is, the both signals 102-1 and 102-2 are at "1".

Therefore, when the highest priority interruption receiving signal (the signal 110-A in the aforementioned case) is applied to the OR gate 405, both the signals 102-1 and 102-2 are at "0". Therefore, the output of an AND gate 406 is "1" so that an R·S-flip-flop 407 is set. Likewise, if the signal 110-B is "1", the signal 102-1 is at "0" whereas the signal 102-2 is at "1", thus the output of an AND gate 408 becomes the value "1" so that an R·S-flip-flop 409 is set. The flip-flops 407, 409, 411 and 413 operate as registers for storing the priority data according to the interruption request to the CPU.

The flip-flop 407 stores the highest priority data "0", the flip-flop 409 the second priority data "1", the flip-flop 411 the third priority data "2", and the flip-flop 413 the lowest priority data "3". Therefore, if the highest priority is assigned to the interruption source C, the priority data "0" is set in the unit 105-C in FIG. 1. Thus, when the scanning data is "0", the interruption receiving signal 110-C is generated in response to the interruption request signal 100-C. At this time, the flip-flop 407 is set as described above.

As mentioned above, when the interruption is received so that the interruption signal 103 becomes the value "1", one of the R.S-flip-flops 407, 409, 411 and 413 corresponding to that priority is set. By the interruption signal 103, the supply of a clock 425 to the T-flip-flop 401 is inhibited by an AND gate 424 to stop the scanning of data in flip-flops 401, 402 and set the data then stored in those flip-flops in the corresponding flip-flop 407 to 413.

AND gates 414, 415, 416 and 417 and an OR gate 418 produce a signal for resetting the T-flip-flops 401 and 402 when the priority data has been set in the corresponding flip-flop 407 to 413. While the interrupt signal 103 is at "1", however, the resetting is inhibited by an AND gate 423. These gates 414 to 418 are employed to control the counter consisting of the flip-flops 401 and 402 in such manner that the interruption having a higher priority than that of the received interruption in the CPU can be received. Namely, when the interruption B having the second priority "1" is received in the CPU, the flip-flop 409 is set and the counter is reset to "0" according to the output of the OR gate 418. The CPU executes the processing according to the interruption C. In this condition, the counter outputs the scanning data "0". If the interruption request of the source A does not occur, the counter counts up its content to "1" in response to the clock 403 and outputs the scanning data "1". At this time, if the interruption request of the source B does not occur, the AND gate 415 produces the value "1" because the flip-flop 409 is set. Therefore, the counter is reset to "0" by means of the output of the OR gate 418. Consequently, the counter produces the scanning data "0" and "1" cyclically. It is clear that when the flip-flop 407 is being set, the scanning data "0" is only produced, that when the flip-flop 411 is being set, the scanning data "0" "1" and "2" are sequentially produced, and that when the flip-flop 413 is being set, all of the scanning data "0", "1", "2" and "3" are sequentially produced.

Now, it is assumed that the interruption receiving signal 110-A is applied to the OR gate 405 when the flip-flop 411 is set. Since the receiving signal 110-A corresponds to the higher priority, this signal 110-A can be received. The flip-flop 407 is set in response to the receiving signal 110-A when the scanning data is "0". The CPU 300 stops the processing of the interruption C and starts the processing of the interruption A having the higher priority. During the processing of the interruption A, the scanning data is always "0". At this time, both the flip-flops 407 and 409 are being set, and a multi-interruption mode is executed. When the processing of the interruption A has been terminated, the CPU 300 generates the terminating signal 113 to the control unit. The terminating signal 113 is applied to the NOR gate 404 and to the flip-flops 407 to 413. Since the flip-flop 407 directly receives the terminating signal 113 at a reset end, the flip-flop 407 is immediately reset. However, the terminating signal 113 is applied to the flip-flop 411 via an AND gate 420 to which the $\bar{Q}$ outputs of the flip-flops 407 and 409 is applied. Therefore, at this time, the flip-flop 411 is not reset and is held in a set state. On the other hand, the CPU 300 restarts the processing of the interruption C which has been stopped and generates the terminating signal 113 after the processing of the interruption C has terminated. As a result, the flip-flop 411 is reset for the first time since the $\bar{Q}$ outputs of the flip-flops 407 and 409 are both "1".

According to the embodiment as mentioned above, a novel interruption control method is proposed as follows:

the step of setting priority data into the units 105-A to 105-D, respectively, by means of the CPU;

the step of scanning the priority data according to scanning data which are sequentially produced in the priority order by the counter (401 and 402) of the control unit 101;

the step of generating an interruption receiving signal 110 in response to an interruption request 100 from an interruption source A, B, C or D when the scanning data is equal to the priority data;

the step of setting the priority data with respect to the interruption receiving signal 110 in the register means (407, 409, 411 and 413);

the step of controlling the counter (401, 402) in such manner that scanning data representing the interruptions having the same priority as that of the interruption which is being processed by the CPU and/or having a higher priority than that of the interruption being processed by the CPU is generated; and the step of resetting the register means (407, 409, 411 and 413) in which the priority data corresponding to the interruption which has been executed by the CPU is set.

As described above, the present invention has an advantage that the priority order for a plurality of interruption sources can be easily changed by means of a simple hardware circuit. Further, an interruption receiving operation can be simplified by employing the scanning operation. Furthermore, is a multi-interruption mode, search of a higher priority interruption is very easy. Moreover, exchange from a higher priority interruption to a lower priority interruption can be smoothly performed at a high speed without any software operations.

In FIGS. 1 to 5, the interruption control apparatus in which the interruption sources have a different priority order from each other is described. However, the present invention can be also applied to the system in which a plurality of interruption sources have the same priority order as shown in FIG. 6. In FIG. 6, five kinds of interruption sources 100-A, 100-B, 100-$C_1$, 100-$C_2$ and 100-D are illustrated. The reference numbers appearing in the drawings with suffixes A, B, $C_1$, $C_2$ and D indicate circuit portions which relate to the processings of the interrupt requests from the interrupt sources 100-A, 100-B, 100-$C_1$, 100-$C_2$ and 100-D, respectively. A suffix C indicates a relationship to both the interruption sources 100-$C_1$ and 100-$C_2$. Incidentally, portions enclosed by broken lines will be called blocks 115-A, 115-B, 115-C and 115-D. The blocks 115-A, 115-B and 115-D indicate circuit portions for processing the interrupt requests from the interrupt sources 100-A, 100-B and 100-D. On the other hand, the block 115-C indicates a portion for controlling the interruption requests from the interruption sources $C_1$ and $C_2$ which have the same priority level. The remaining blocks 115-A, 115-B and 115-D which have a common construction each have one interrupt request storage unit 107 and one interruption control unit 106, whereas the block 115-$C_2$ has two interrupt request storage units 106-$C_1$ and 106-$C_2$ and two interrupt request control units 107-$C_1$ and 107-$C_2$. The interruption request signals 100-A to 100-D are stored in the corresponding interrupt request storage units 107-A, 107-B, 107-$C_1$, 107-$C_2$ and 107-D. The control units 106 act as an interruption mask means which inhibits an interruption. The priority data are set in priority assigning units 105-A, 105-B, 105-C and 105-D. The priority order is detected by detecting units 104-A, 104-B, 104-C and 104-D. Reference number 116 indicates a selecting unit.

The block 115-A will now be described.

The priority data is set in the priority assigning unit 105-A by the program control (or by a key signal or a switch signal from outside the block 115-A). The control unit 101 outputs scanning data 102 for scanning the priority order. A detecting unit 104-A compares the scanning data 102 with the priority data in the priority assigning unit 105-A, and produces a coincidence signal 109-A when the both data are equal. The interruption receiving unit 108-A outputs an interruption receiving signal 110-A when the coincidence signal 109-A has been outputted, when the interruption request unit 107-A has stored the request signal sent from the interrupt source and when the control unit 106-A outputs a grant signal. The blocks 115-B and 115-D have the same construction as that of the block 115-A.

FIG. 7(a) shows an example of the circuit of the block 115-A. R·S-F/F 301-A and 302-A are the set and reset type flip-flops which are operative to store the priority data consisting of higher and lower bits sent from the CPU 300. The priority data can be programmably changed by the CPU 300 by the use of signals 310-A and 311-A. The signals 102-1 and 102-2 are higher and lower bits of the scanning data 102. EX-OR gates 305-A and 306-A compare the higher bit of the priority data in the R·S-F/F 301-A with the higher bit 102-1 of the scanning data, and the lower bit of the priority data in the R·S-F/F 302-A with the lower bit 102-2 of the scanning data, respectively. When the priority data and the scanning data 102 are equal, an NOR gate 307-A outputs the logical value "1" indicating the coincidence signal 109-A. These two EX-OR gates and the one NOR gate together form the detecting unit 104-A. An R·S-F/F 303-A is an interruption mask register which corresponds to the control unit 106-A so that it is set by the use of a signal 312-A when the interruption is masked (inhibited) while it is reset when the interruption is not masked (granted). An R·S-F/F 304-A is an interruption request flag which is set, when an interruption request signal 313-A (100-A) is sent from the interruption source A, and is reset either when the interruption request is not generated or when the output of an AND gate 308-A is at "1". This request flag 304-A corresponds to the storing unit 107-A. An AND gate 108-A is operative to output the interruption receiving signal 110-A when the coincidence signal 109-A is at the logical value "1", when the R·S-F/F 303-A, as the mask register, is reset, and when the request flag 304-A is set. This AND gate forms the interruption receiving unit 108-A. A vector generating unit 309-A transfers a vector address 313-A for designating the processing of the interruption A to the CPU 300 when an acknowledgement signal 314 is sent from the CPU 300. The request flag 304-A is reset when the interruption receiving signal 110-A is at "1" and when the acknowledgement signal 314 is at "1". A circuit 111 is used to control the simultaneous occurrence of a plurality of interruption receiving signals as described hereinafter, but may be omitted in this embodiment. The remaining blocks 115-B and 115-D may have the same construction as the block 115-A.

Next, the block 115-C will be described.

The following description of the circuit forming block 115-C is limited to those portions of the circuit different from the circuit of block 115-A. The remaining portions of FIG. 7(b) are of the same construction and operation as the corresponding portions of FIG. 7(a) and thus, a further description of those common portions will be omitted. The block 115-C has two interruption request storage units 107-$C_1$ and 107-$C_2$ and two interruption request control units 106-$C_1$ and 106-$C_2$. As a result, the block 115-C can assign two interruption requests with the same priority level. The priority assigning unit 105-C and the detecting unit 104-C can be commonly used. This makes it unnecessary to double the number of all the components. The block 115-C is used to control the serial data receiving interruption and a sending interruption. These data transferring interruptions occur in one group of operations, because the serial data receiving operation and a sending operation are not executed in parallel. Therefore, there is no problem even if the priorities of these interruptions are set in the same priority level. In accordance with this consideration, the priority assigning unit and the detecting unit are commonly used in the block 115-C to reduce the number of the components.

The priority assigning unit 105-C, the detecting unit 104-C and the coincidence signal 109-C may be similar to those of the corresponding portions of the other blocks 115-A, 115-B and 115-C. The interruption receiving unit 108-C outputs the interruption receiving signal 110-C when the coincidence signal 109-C has been outputted, when either one or both the interruption control units 106-C1 and 106-C2 are not masked and when either one or both the interruption request storing units 107-C1 and 107-C2 are storing the interruption request signals. In this case, when the two interruption requests from the sources C1 and C2 occur simultaneously, one of them is selected by the selecting unit 116. In this embodiment, the request from the source C1 is selected. The interruption receiving unit 108-C outputs an interruption receiving signal 110-C corresponding to the source C1. Incidentally, the selecting condition can be freely changed. The selecting unit 116 is provided to eliminate complicated software procedures.

R·S-F/Fs 303-C1 and 303-C2 act as interrupt mask registers which correspond to the interruption request control units 106-C1 and 106-C2, respectively, so that they are set by the use of signals 312-C1 and 312-C2 when the interruptions must be masked and are reset when the interruptions are granted. R·S-F/Fs 304-C1 and 304-C2 are interruption request flags which are set in response to interruption request signals 313-C1 (100-C1) and 313-C2 (100-C2) and are reset either when the interruption is not requested or when the outputs of AND gates 308-C1 and 308-C2 are at "1". These request flags 304-C1 and 304-C2 correspond to the storing units 107-C1 and 107-C2, respectively. AND gates 315-C1 and 315-C2 are provided to allow or to inhibit the interruption request in accordance with the contents of the mask registers R·S-F/Fs 303-C1 and 303-C2, respectively. An AND gate 316 constructs the selecting unit 116 and inhibits the signal 313-$C_2$ according to the signal 313-C1. AND gates 317-$C_1$ and 317-$C_2$ output the value "1" when the coincidence signal 109-C is the logical value "1" and when the AND gates 315-C1 and 316 are at "1". Both the outputs of the AND gates 317-C1 and 317-C2 cannot be at "1" simultaneously. The interruption receiving signal 110-C, i.e., the output of an OR gate 318 becomes the value "1" when one of the outputs of AND gates 317-C1 and 317-C2 is at "1". A vector generating unit 309-A outputs the vector address 313-C to the CPU 300 in accordance with the outputs of the AND gates 317-C1 and 317-C2 when the acknowledgement signal 314 is sent from the CPU 300. The request flags 304-C1 and 304-C2 are reset when the acknowledgement signal 314 becomes "1".

The control unit 101 of FIG. 5 can be used in this embodiment, and therefore, the detailed description of the control unit is omitted here.

FIG. 8 is a timing chart showing the operations of this embodiment. The signals 102, 109-A, 109-B, 109-C, 109-D, 107-B, 107-C1, 107-C2, 103 and 113 correspond to those indicated by the same numerals in FIG. 6. Data 114 stored in the control unit 101 indicate the priority data of the interruption being processed in the CPU. Incidentally, the priority is assumed to become higher in the order of "3", "2", "1" and "0" with "0" being the highest priority.

At first, the priority data is written in each of the priority assigning units by the use of the signal which is prepared by the program. Now, it is assumed that the priority "0" is written in the priority assigning unit 105-A, that the priority "1" is written in the unit 105-B, that the priority "2" is written in the unit 105-C, and that the priority "3" is written in the unit 105-D. In the absence of the interruption request or in the case where the interruption is masked (inhibited), the coincidence signals 109-A, 109-B, 109-C and 109-D are sequentially varied, as for a period P in FIG. 8, in response to the scanning data 102 which are changed between "0", "1", "2" and "3". Here, when the interruption requests occur at a timing T1 from the source 100-C2 and at a timing T2 from the interrupt source 100-C1 so that the storing units 107-C1 and 107-C2 store the request signals "1", the two interruptions are enabled by the interruption control units 106-C1 and 106-C2. At this time, the selecting unit 116 selects the storing unit 107-C1 as described above. When the scanning data 102 becomes the value "2" so that the coincidence signal 109-C is generated, the interruption request from the storing unit 107-C1 is received, and the interruption signal 103 is sent at a timing T3 to the CPU 300. The interruption request from the storing unit 107-C2 is no received until the interruption processing for the storing unit 107-C1 is terminated. On the other hand, the priority data "2" received at the timing T3 is stored as the data 114 in the control unit 101 as described in FIG. 5.

When the CPU 300 is executing the interruption processing of the priority data "2", the scanning data 102 is returned again to the value "0" (at a timing T4), and only the priorities "0" and "1" can be received. Incidentally, the scanning data 102 outputs the value "2", too, but the control unit 101 does not receive the interruption with respect to the priority "2" being received at present any more.

When the interruption processing of the storing unit 107-C1 is ended so that the terminating signal 113 is sent from the CPU 300 (at a timing T5), the data 114 disappear. As a result, the scanning data 102 varies in the priority of "0", "1", "2" and "3" so that all the interruptions can be received. When the scanning data 102 becomes the value "2" so that the coincidence signal 109-C is generated, the interruption request of the storing unit 107-C2 is received (at a timing T6). When the interruption request of higher priority is generated at a timing T7 from the source 100-B so that the output of the storing unit 107-B becomes the value "1", the scanning data 102 becomes the value "1", if that interruption request is enabled by the interruption control unit 106-B. The interruption of the source B is sent to the CPU 300 when the coincidence signal 108-B is generated. In accordance with this, the data 114 are varied from the value "2" to the value "1" (at a timing T8). The scanning data 102 is returned again to the value "0" after it takes the value "1" (at a timing T9). In other words, the operation is such that an interruption with priority "0" is received by the CPU at any time it appears during the interruption processing.

When the multiple interruptions are ended so that the terminating signal 113 is sent from the CPU 300 (at a timing T10), the data 114 are varied from the value "1" to the value "2", and the scanning data 102 is varied in the order of "0", "1" and "2" so that only the interruption priorities "0" and "1" can be received.

When the interruption processing of the storing unit 107-C2 is terminated so that the terminating signal 113 is sent from the CPU (at a timing T11), the data 114 disappears so that the initial state in which all the interruptions can be received appears again.

FIG. 9 is a block diagram of another embodiment according to the present invention. In this embodiment the four interrupt sources A, B, C and D are the same as in FIG. 1. The portions enclosed by broken lines in FIG. 9 have the same construction as that of FIG. 1.

A priority assigning unit 105 stores priority data therein. A detecting unit 104 compares the scanning data 102 from the control unit 101 with the priority data in the unit 105, and if the two are coincident, a coincidence signal 109 is generated. An interruption receiving unit 108 generates an interruption receiving signal 110 when the coincidence signal 109 is generated, when the control unit 106 is in a non-mask state, and when the interruption request signal if outputted from the storage unit 107. If the interruption receiving signal is generated in another broken-line block, the interruption receiving signal 110-A is inputted together therewith to a priority setting unit 111. The priority setting unit 111 is used to select one among a plurality interruption receiving signals which are simultaneously transferred to the control unit 101. Now, if the receiving signal 110-A is selected by the setting unit 111, the priority setting unit 111 outputs signals 112-B, 112-C and 112-D indicating a presence of the interruption with the higher priority than the other blocks, thereby only one receiving signal can be transferred to the control unit 101.

FIG. 10 is a circuit diagram of the units 104-A, 105-A, 106-A, 107-A and 108-A shown in FIG. 9. Set and reset type flip-flops 301-A and 302-A are operative to store a priority data with higher and lower bits. The priority data is sent from the CPU 300 by means of signals 310-A and 311-A. Signals 102-1 and 102-2 are higher and lower order bits of the scanning data 102. EX-OR gates 305-A and 306-A and an NOR gate 307-A are included in the detecting unit 104-A. When the priority data and the scanning data 102 are equal, the NOR gate 307-A outputs the coincidence signal 109-A (i.e., the logical value "1"). 303-A indicates a mask register which corresponds to the control unit 106-A, 304-A indicates a flag which is set when an interruption request signal 313-A is sent from the interruption source, and which is reset when the request signal is not generated or when the output of an AND gate 308-A is at "1". This flag 304-A corresponds to the storage unit 107-A. 108-A indicates an AND gate which is operative to output the interruption receiving signal 110-A when the coincidence signal 109-A becomes the logical value "1", when the mask register (i.e. R·S-F/F 303A) is reset, and when the interruption request flag is set. This AND gate is the interruption receiving unit 108-A. A vector generation unit 309-A outputs a vector address 313-A for designating a processing to be executed according to the interruption to the CPU 300 when an acknowledgement signal 314 is sent from the CPU 300. The flag 304-A is reset when the receiving signal 110-A is at "1" and when the acknowledgement signal 314 is at "1". 111 is the priority setting unit which is described in detail hereinafter.

FIG. 11 is a specific circuit diagram of the control unit 101 which has substantially the same function as that of FIG. 5. The signals 102-1 and 102-2 are the outputs of T-F/F 401 and T-F/F 402, respectively. The signal 102-2 is inverted at the trailing edge of a clock signal 403, and the signal 102-1 is inverted at the trailing edge of the signal 102-2. In other words, the T-F/Fs 401 and 402 form a quarternary counter for counting the clock signals 403. The signals 102-1 and 102-2 represent the scanning data. The quarternary counter constructed of the T-F/Fs 401 and 402 is reset when the output of an NOR gate 404 is at the logical value "1". When any of the interruption receiving signals 110-A, B, C and D is outputted, the output of the priority setting unit 111 becomes the logical value "1".

Now, it is assumed that when R·S-F/Fs 407, 409, 411 and 413 are respectively reset, the output of an OR gate 418 is at the logical value "0". An AND gate 432 responds to the interruption signal 103. At this time, when both the signals 102-1 and 102-2 are the logical value "0", and when the interruption signal 103 is the logical value "1", the output of an AND gate 406 becomes the logical value "1" so that the R·S-F/F 407 is set. Likewise, when the signal 102-1 is at the logical value "0" whereas the signal 102-2 is at the logical value "1" and when the interruption signal 103 is at the logical value "1", the output of an AND gate 408 becomes the logical value "1" so that the R·S-F/F 409 is set. When the signal 102-1 is at the logical value "1" whereas the signal 102-2 is at the logical value "0" and when the interruption signal 103 is at the logical value "1", the output of and AND gate 410 becomes the logical value "1" so that the R-S-F/F 411 is set. When both the signals 102-1 and 102-2 are at the logical value "1" and when the interruption signal 103 is at the logical value "1", the output of an AND 412 becomes the logical value "1" so that the R-S-F/F 413 is set.

In response to the interruption signal 103, the supply of a clock 425 to the T-F/F 401 is inhibited by an AND gate 424. AND gates 414, 415, 416 and 417 and an OR gate 418 output signals for resetting the T-F/Fs 401 and 402 when the priority data being set in the R-S-F/Fs 407 to 413 is equal to the scanning data 102.

This embodiment is suitable for an application system in which a plurality of interruption sources have the same priority level.

FIG. 12 is a circuit diagram showing the priority setting unit 111, and FIG. 13 is a timing chart illustrating the operation of the same. Now, the following description is directed to the case in which the contents of the priority assigning units 105-A, 105-C and 105-D corresponding to the sources A, C and D, respectively, are set at the value "3" and in which the interruption request signals 100-A, 100-C and 100-D are simultaneously generated.

When the scanning data 102 becomes the value "3", all the coincidence signals 109-A, 109-C and 109-D are simultaneously the logical value "1" (at a timing T1 of FIG. 13). At this time, the storage units 107-A, 107-C and 107-D have stored the interruption request signals. When the interruption control units 106-A, 106-C and 106-D are in a non-mask state, they output the logical value "1". The output of the interruption receiving unit 108-A becomes the logical value "1", so that the OR gate 501 of the priority setting unit 111 outputs the logical value "1". At this time, the output of the interruption receiving unit 108-B is at the logical value "0" of the absence of the interruption request. At this time, however, the output lines 112-C and 112-D are at the logical value "1", so tat the interruption receiving signals 110-C and 110-D, i.e., the outputs of the interruption receiving units 108- and D become the logical value "0". In this case, only the interruption receiving signal 110-A is transferred to the CPU, whereas the other interruption receiving signals 110-C and 110-D are inhibited even if the interruptions are enabled and demanded. More specifically, only the interruption receiving signal 110-A is inputted to the control unit 101, and the vector address 313-A is sent to the CPU. In the case of FIG. 12, the interruption source A has the highest priority. However, by changing the connection between the interruption receiving signals 110-A, B, C and D and the OR gates 501, 502 and 503, the sources can be set at an arbitrary priority.

As described hereinbefore, in the case that the interruption requests with the same priority are simultaneously generated, the priority setting unit 111 can select only a predetermined interruption receiving signal therefrom and can transfer the selected interruption receiving signal to the CPU.

According to the present invention, there is provided an interruption control apparatus which can set and change the interrupt reception priority to a predetermined scheduling, which is freed from any complex procedures even during multiple interruption processing.

Further, a plurality of interruptions can be controlled with a reduced number of hardware elements because complex procedures can be eliminated even for the multi-interruption processing. Furthermore, a plurality of interruptions having the same priority can be controlled without software processings.

Furthermore, since the priority determining means has a two-step construction, according to the present invention, a plurality of interruption requests having a different priority order can be selected by the action of a front-step determining means (i.e., assigning units), and one of the plural interruption requests having the same priority order can be selected in accordance with a predetermined priority by the action of a rear-step determined means (i.e., selecting units).

What is claimed is:

1. An interruption control apparatus comprising a plurality of interruption priority detecting units having different levels of priority of interruption, and means for scanning said plurality of interruption priority detecting units with different signals successively and periodically in a time-divisional manner, said interruption priority detecting units having first storing means storing priority data representing the respective priority levels of those units, second storing means storing an interruption signal applied to the respective units, detecting means coupled to the respective first storing means and said scanning means for detecting that the scanned signal coincides with the priority data and outputting a detection signal, and means coupled to the respective detecting means and the respective second storing means for requesting interruption in response to said detection signal outputted from said detecting means and to said interruption signal stored in said second storing means, and said scanning means including a counter generating counting signals as said different signals.

2. The interruption control apparatus as claimed in claim 1, in which said counter of said scanning means is reset when the number of said counting signals reaches the number of said interruption priority detecting units.

3. The interruption control apparatus as claimed in claim 2, further comprising means for resetting said counter when said interruption signal is outputted from one of said interruption priority detecting units.

4. An information processing apparatus executing an interruption operation comprising a plurality of interruption detecting units, each unit having means for receiving an interruption request signal and means for storing priority data representing a priority level, means for writing different priority data into the storing means of different ones of said interruption detecting units, means for applying different interruption request signals to the receiving means of different ones of said interruption detecting units, means for generating a plurality of priority signals in a predetermined order, means coupled between said generating means and each of said units for transferring the generated priority signals to each of said units at the same time, each of said units further having means coupled to said coupling means and said storing means for comparing the transferred priority signals with the priority data stored in said storing means and means coupled to said comparing means and said receiving means for providing an interruption signal when a transferred priority signal matches priority data stored in said storing means, processing means coupled to said providing means for performing an interruption operation indicated by said interruption signal, and means for inhibiting the generation of the priority signal or signals representing the priority level or levels lower than that of the priority signal which has been applied to such one of said units that provides said interruption signal.

5. An interruption control apparatus comprising:
- a plurality of interruption priority detecting units, each unit having a receiving means for receiving an interruption request signal and a storing means for storing a priority data representing a priority level of that unit, different interruption request signals from different interruption sources external to said interruption control apparatus being applied to different interruption priority detecting units and different priority data being stored in different interruption priority detecting units;
- means for successively generating a plurality of priority signals in a predetermined order, said plurality of priority signals having different priority levels; and
- means for coupling said generating means to said interruption priority detecting units, respectively, to simultaneously apply the generated priority signals to said interruption priority detecting units;
- each of said interruption priority detecting units further having a comparing means coupled to the storing means of that unit and to said coupling means for comparing the content of said priority data stored in said storing means with the priority signal applied thereto through said coupling means from said generating means, an output means responsive to said comparing means for outputting an interruption signal when the applied priority signal matches the priority data stored in said storing means, and means for controlling said generating means in response to occurrence of said interruption signal in any one of said interruption priority detecting units such that said generating means generates only the priority signal or signals representing a priority level or levels equal to or higher than that of the priority signal which has been applied to said one of said interruption priority detecting units.

* * * * *

UNITED STATES PATENT AND TRADEMARK OFFICE
CERTIFICATE OF CORRECTION

PATENT NO. : 4,807,117

DATED : February 21, 1989

INVENTOR(S) : ITOKU

It is certified that error appears in the above-identified patent and that said Letters Patent is hereby corrected as shown below:

Column 3, line 42, delete " reguest" and insert --request--;
Page 6, line 14

Column 3, line 44, delete "transterring" and insert --transferring--;
Page 6, line 15

Column 15, line 38, delete "tat" and insert --that--;
Page 31, line 3

Signed and Sealed this

Fifth Day of June, 1990

Attest:

HARRY F. MANBECK, JR.

Attesting Officer

Commissioner of Patents and Trademarks